(12) United States Patent
Imaino et al.

(10) Patent No.: US 11,556,343 B2
(45) Date of Patent: Jan. 17, 2023

(54) COMPUTATIONAL METHOD FOR TEMPORAL POOLING AND CORRELATION

(71) Applicant: INTERNATIONAL BUSINESS MACHINES CORPORATION, Armonk, NY (US)

(72) Inventors: Wayne I Imaino, San Jose, CA (US); Ahmet S Ozcan, San Jose, CA (US); J Campbell Scott, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1276 days.

(21) Appl. No.: 15/713,041

(22) Filed: Sep. 22, 2017

(65) Prior Publication Data

US 2019/0095211 A1 Mar. 28, 2019

(51) Int. Cl.
*G06N 3/08* (2006.01)
*G06F 9/38* (2018.01)
*G06N 3/04* (2006.01)

(52) U.S. Cl.
CPC ............... *G06F 9/38* (2013.01); *G06N 3/04* (2013.01); *G06N 3/049* (2013.01); *G06N 3/0454* (2013.01); *G06N 3/08* (2013.01); *G06N 3/084* (2013.01); *G06N 3/088* (2013.01)

(58) Field of Classification Search
CPC ........ G06N 3/04; G06N 3/0454; G06N 3/049; G06N 3/08; G06N 3/084; G06N 3/088
See application file for complete search history.

(56) References Cited

U.S. PATENT DOCUMENTS

| | | |
|---|---|---|
| 7,430,546 B1 | 9/2008 | Suri |
| 7,739,208 B2 | 6/2010 | George et al. |
| 7,937,342 B2 | 5/2011 | George et al. |
| 3,219,507 A1 | 7/2012 | Jaros et al. |
| 8,219,507 B2 | 7/2012 | Jaros et al. |
| 8,290,886 B2 | 10/2012 | George et al. |
| 9,183,493 B2 | 11/2015 | Richert et al. |
| 9,311,594 B1 | 4/2016 | Fisher et al. |
| 9,373,085 B1 * | 6/2016 | George .................. G06N 3/049 |
| 9,390,372 B2 | 7/2016 | Modha |
| 10,528,863 B2 * | 1/2020 | Hawkins ................ G06N 5/047 |

(Continued)

FOREIGN PATENT DOCUMENTS

| | | |
|---|---|---|
| JP | H09134207 A | 5/1997 |
| WO | 9016038 A1 | 12/1990 |

(Continued)

OTHER PUBLICATIONS

Slack et al., "Self-Organising Temporal Pooling", May 2017, 2017 International Joint Conference on Neural Networks (IJCNN), pp. 4316-4323. https://ieeexplore.ieee.org/abstract/document/7966402 (Year: 2017).*

(Continued)

*Primary Examiner* — Ying Yu Chen
(74) *Attorney, Agent, or Firm* — Erik A. Huestis; Stephen J. Kenny; Foley Hoag LLP

(57) ABSTRACT

A computational method is disclosed for the simulation of a hierarchical artificial neural network (ANN), wherein a single correlator pools, during a single time-step, two or more consecutive feed-forward inputs from previously predicted and now active neurons of one or more lower levels.

22 Claims, 10 Drawing Sheets

(56) References Cited

U.S. PATENT DOCUMENTS

| | | | |
|---|---|---|---|
| 2010/0312735 | A1 | 12/2010 | Knoblauch |
| 2010/0312736 | A1 | 12/2010 | Kello |
| 2011/0047110 | A1 | 2/2011 | Rinkus |
| 2011/0225108 | A1 | 9/2011 | Hawkins et al. |
| 2013/0297539 | A1 | 11/2013 | Piekniewski et al. |
| 2014/0006774 | A1 | 3/2014 | Solari |
| 2014/0067740 | A1 | 3/2014 | Solari |
| 2014/0089232 | A1 | 3/2014 | Buibas et al. |
| 2015/0106316 | A1 | 4/2015 | Birdwell et al. |
| 2016/0267380 | A1 | 9/2016 | Gemello et al. |
| 2017/0255861 | A1 | 9/2017 | Hawkins et al. |
| 2018/0247189 | A1* | 8/2018 | Adel .................. G06Q 50/01 |
| 2019/0095211 | A1* | 3/2019 | Imaino .................. G06F 9/38 |

FOREIGN PATENT DOCUMENTS

| | | | |
|---|---|---|---|
| WO | 2013070612 | A1 | 5/2013 |
| WO | 2015020802 | A2 | 2/2015 |

OTHER PUBLICATIONS

Hawkins et al., "Biological and Machine Intelligence (BAMI) A living book that documents Hierarchical Temporal Memory {HTM)", Mar. 8, 2017 Version, Numenta, Inc., pp. 1-69. [same as IDS Sep. 11, 2018 NPL No. 5] (Year: 2017).*
Cui et al., "The HTM Spatial Pooler—a neocortical algorithm for online sparse distributed coding", Feb. 16, 2017, bioRxiv, cover page and pp. 1-15. (Year: 2017).*
Fernando et al., "Discriminatively Learned Hierarchical Rank Pooling Networks", Jun. 24, 2017, pp. 335-355. (Year: 2017).*
Ahmad et al., "Properties of Sparse Distributed Representations and their Application to Hierarchical Temporal Memory", 2015, pp. 1-18. (Year: 2015).*
Zakaria et al., "Artificial Neural Network : A Brief Overview", Feb. 2014, Mabrouka AL-Shebany et al. Int. Journal of Engineering Research and Applications ISSN : 2248-9622, vol. 4, Issue 2( Version 1), pp. 07-12. (Year: 2014).*
Anonymous, "Fast Simulation with Multiple Multi-Layer Neural Networks," IP.com, Sep. 19, 2016, 6pgs.
IBM, "Selflearning Method To Predict a Workload Indicator for Provisioning of Resources," IP.com, Sep. 18, 2007, 11pgs.
Orchard et al., "HFirst: A Temporal Approach to Object Recognition," IEEE Transactions on Pattern Analysis and Machine Intelligence, 37(10), Oct. 2015, 13pgs.
Theyel et al., "The corticothalamocortical circuit drives higher-order cortex in the mouse," Nature Neuroscience, 13(1), Jan. 2010, pp. 84-89.
Mendes et al., "Temporal downscaling: a comparison between artificial neural network and autocorrelation techniques over the Amazon Basin in present and future climate change scenarios," Theoretical and Applied Climatology, 100(3-4), May 2010, 9pgs.
"Numenta: Leading the New Era of Machine Intelligence," <www.numenta.com>, 28pgs.
"Overview of the Temporal Pooler," <https://github.com/numenta/nupic.research/wiki/Overview-of-the-Temporal-Pooler>, 6pgs.
Alonso et al., "Thalamus controls recurrent cortical dynamics," Nat Neurosci, 18(12), 2015, pp. 1703-1704.
Chung et al., "Gated feedback recurrent neural networks," Proceedings of the 32nd International Conf. on Machine Learning, Lille, France, 2015, V37, 9pgs.
Bienenstock et al., "Theory for the Development of Neuron Selectivity: Orientation Specificity and Binocular Interaction in Visual Cortex," The Journal of Neuroscience, 2(1), Jan. 1982, pp. 32-48.
Felleman et al., "Distributed hierarchical processing in the primate cerebral cortex," Cereb Cortex, 1(1), 1991, pp. 1-47.
Hawkins et al., "Biological and Machine Intelligence (BAMI)," Numenta, Inc., 2016, pp. 1-69.
Rybarsch et al., "Self-organized criticality in neural network models," arXiv preprint ArXiv:1212.3106, Dec. 13, 2012, 30pgs.
Kawato et al., "A hierarchical neural-network model for control and learning of voluntary movement," Biol Cybern, 57(3), 1987, pp. 169-185.
Machine Learning Algorithms for Smart Meter Diagnostics, IP.com No. IPCOM000242462D, Jul. 16, 2015.
Stollenga et al., "Deep networks with internal selective attention through feedback connections," Adv Neur In, 2014, pp. 3545-3553.
Diekelmann et al., "The memory function of sleep," Nature Reviews, Feb. 2010, V 11, pp. 114-126.
J. Hawkins et al., "Hierarchical Temporal Memory Concepts, Theory, and Terminology," Internet Citation, Mar. 27, 2007, XP002499414, 20pgs.
Y. Saalmann et al., "Cognitive and Perceptual Functions of the Visual Thalamus," Neuron, 71(2), Jul. 28, 2011, pp. 209-223.
Hawkins et al., "Sequence memory for prediction, inference and behaviour," Phil Trans. R. Soc. B, (2009) 364, 1203-1209 doi:10.1098/rstb.2008.0322.
Sala et al., "Self-Organization in Networks of Spiking Neurons," (1998) University of Toledo and Medical College of Ohio, 14pgs.
Siemens et al., "A supervised learning approach for Weighted Parameter Estimation Model using combinatorial neural network framework," (2010) Siemens AG Technical Disclosure, 5pgs.
Anonymous, "Fast Simulation with Multiple Multi-Layer Neural Networks," (2016). Technical Disclosure, 6pgs.
Rumelhart et al., "Learning representations by back-propagating errors," Nature, v323, Oct. 1986, pp. 533-536.
Rojas, Neural Networks: A Systematic Introduction, Springer-Verlag, Berlin, Jul. 1996, 509pgs.
Hawkins et al., On Intelligence: How a New Understanding of the Brain will Lead to the Creation of Truly Intelligent Machines, Times Books, 2004, 174pgs.
Response to Examiner's Observations for EP Application No. 18768880.9 dated Jan. 18, 2022.
European Examination Report for EP Application No. 18768880.9 dated Oct. 7, 2021.
Hawkins et al., "Hierarchical Temporal Memory Concepts, Theory, and Terminology," Numenta: 20 pages (2007).
Saalmann et al., "Cognitive and Perceptual Functions of the Visual Thalamus," Neuron, 71(2): 209-223 (2011).
Notice of Reasons for Refusal English Translation for Japanse Application No. 2020-514515 dated Dec. 23, 2021.

* cited by examiner

Pseudo-code for temporal pooling and correlation

```
For each time-step (t)
  For each region (R) in network
    In correlator
      concatenate data from all connected lower regions (-> binary input vector I_0)
      if temporal pooling,
        form union of I_0 with I_-1 (and with I_-2 etc.) (-> binary vector I_R)
        save ... I_-1 to I_-2, I_0 to I_-1
      else I_R = I_0
      with I_R, activate output bits of correlator (-> binary vector S_R)
      update synapses using activity of I_R and S_R
    In sequence memory
      input S_R activates cells in mini-columns (-> binary vector A_R)
      cells previously predicted (P_-1) and now active (A_R) are verified (output V_R, to next higher region)
      active cells (A_R) generate new prediction (P_0)
      update synapses using previously active cells (A_-1) and verified cells (V_R)
      save A_R to A_-1
      save P_0 to P_-1
```

Notes:
1. Variables I, S, A, P, V are binary vectors
2. subscript 0 refers to current time step (t), subscript -1 refers to previous time (t-1), subscript -2 to t-1, etc.

COMPUTATIONAL METHOD FOR TEMPORAL POOLING AND CORRELATION

This invention was made with Government support under Contract No. N66001-15-C-4034 awarded by Defense Advanced Research Projects Agency (DARPA). The Government has certain rights to this invention.

BACKGROUND OF THE INVENTION

Field of Invention

The present invention relates generally to the field of artificial neural networks. More specifically, the present invention is related to computational methods for temporal pooling and correlation.

Discussion of Related Art

Artificial neural networks (ANNs) are increasingly successful in addressing problems in artificial intelligence, particularly those that require large amounts of data and long times to process. Such networks are typically organized in a hierarchical fashion, with data being fed forward from lower levels of the hierarchy to those above (see FIG. 1). FIG. 1 shows an example of a hierarchical network consisting of 7 regions on three levels, where the solid arrows show the feed-forward pathways of data from lower to higher levels, and where the receiving region pools and correlates the data coming from below. In the simplest case, the data represent static features, and the role of the network is to signal that a certain feature, or set of features, is present. Optionally, the signal may be fed back down the hierarchy (dotted arrows in FIG. 1) to provide additional context to the lower regions as they process their input.

As a specific example, consider a static image consisting of several pixels. Data about each pixel, color and (relative) position are "pooled," i.e., combined into a composite dataset, and fed into the lowest level of the hierarchy. In the description of this invention, we use the terms pool, pooled, pooling, etc. exclusively to indicate the merging or combination of data from different sources.

If a certain pixel is black, and the pixels above and below it are also black, but the pixels to the left and right of all three are white, then the three pixels together indicate (part of) a vertical line. All nine pixels (three black and six white) are correlated, in the sense that this is a frequently occurring pattern. The lowest regions in the hierarchy correlate their pooled data to form a (new) representation of each specific feature. The representation of the vertical line is passed upwards to the next level of the hierarchy where it may, for example, be combined with a horizontal line. Depending on their relative locations, these two features together may form part of a more complex feature, such as an L-shaped corner, a cross like a + sign, a T-shape or perhaps part of the letter E. By successive steps of such synthesis, increasingly complex features are represented at higher levels of the hierarchical network.

When the data are serial in time, as is most often the case, the network should recognize not only the object, but also how it is moving and therefore where it is most likely to be next. Consider the case of a ball thrown towards the observer. The static representation is quite simple—it is merely a circle. However, as time goes by the circle grows larger, and its position in the field of view, or relative to the background, or more likely both, changes. The observer determines the motion of the ball from this succession of input data, and is able to estimate when the ball will reach it, and perhaps what must be done to avoid it, to catch it, to hit it, etc.

The network which processes this time-dependent data must form a more complex representation. At the lowest level, the feature may still be represented only as a circle, but the attributes of that circle (its size and position) are changing—there is a temporal sequence of observations that, taken together indicate "ball approaching."

Briefly, ANNs comprise a number of "nodes" which are programmed to act somewhat like the neurons of the brain. Each node is connected to many other nodes through connections that act as synapses. The activity of each node is passed via axons to each of its synapses. The synapses are assigned a certain weight, which indicates what fraction of the activity is passed into the dendrites of the target node. Mathematically this is expressed as a product, $x_i\, w_{ij}$, where $x_i$ is the activity of node i in level x and $w_{ij}$ is the weight of the synapse connecting nodes i and j, where j is the index for a different level of the hierarchy with nodes y. The basic operation of each node is to sum the weighted inputs from all the nodes to which it is connected, and then to apply a non-linear ("squashing" or threshold) function ($\sigma$) to determine its own activity, i.e., $$y_j = \sigma\left(\sum_i x_i w_{ij}\right).$$

Learning is accomplished by adjusting the weights (w) in order to minimize an error or cost function.

Static ANNs simply feed data upwards through the hierarchy. In recurrent neural networks (RNNs), time dependent behavior is processed by taking the output activity at time t of each node in the network, and routing it to the inputs, at time t+1 of (potentially) any other node. There are many variants of RNN, depending on where the time-varying output is routed. RNNs have proved to be useful in the analysis of time-varying data, but they are not designed to form representations that have clear semantic meaning, such as "ball approaching."

A very different type of hierarchical network is described by Hawkins and his colleagues at Numenta. In essence, they describe a network of networks. The sub-networks, which we call "regions", (see FIG. 1) contain many neurons which are arranged in structures that correspond to the layers and mini-columns of the mammalian cortex. Each layer of neurons is responsible for a specific set of cognitive functions. In particular, as with cortical layer-4 (L4) of the brain, there are neurons whose dendrites receive bottom-up data from levels lower in the hierarchy, as well as from core cells of the thalamus. The Hebbian learning rules which modify the weights of the synapses of the L4 dendrites lead to correlations among the inputs; i.e., axons that are active at the same time tend to connect to the same L4 neuron. Conversely, the firing of that neuron signals the correlation of activity among its connected axons. L4 is a correlator.

When L4 neurons fire, they activate some of the neurons in the mini-columns of layers 2 and 3 above them. (The historical distinction between layers 2 and 3 is no longer made in modern neuro-science; this part of the cortex is simply identified as L2/3.) L2/3 functions as a sequence memory. The lateral connections between neurons in different mini-columns do not cause immediate firing, rather they are modulating in their behavior: the receiving neuron is put in a state that makes it more likely to fire when it receives input from the L4 neuron at the bottom of its mini-column. This may be termed "prediction" and it is akin to biological depolarization. If the column is then indeed subsequently active, the learning rules reinforce the weights of the synapses that contributed to the correct prediction. Because there are multiple cells in each mini-column, only a small number of which fire in response to the L4 input, the specific set of correctly predicted cells encodes information about the previously active cells responsible for the prediction. In other words, the previously active cells provide the context for the cells that are now active, and so on back through time. L2/3 learns a sequence of firing patterns.

However, there is little semantic meaning of any single firing pattern in the sequence—additional processing is required in order to form a new representation of the entire sequence. This is achieved by temporal correlation of the firing activity of the L2/3 neurons, and is the subject of the current invention.

It is customary to call the firing pattern of a set of neurons a Sparse Distributed Representation (SDR). This is nothing more than a large binary array, most often a vector, of ones and zeroes. Each element in the array represents a single neuron. When the neuron is active, its bit is one (1) otherwise it is zero (0). The vector is "sparse", because only a small fraction of the bits, less than 20%, and more typically less than 5%, are on at the same time. It is "distributed" because the active bits are spread throughout the entire vector.

On their website, Numenta describes a temporal pooler as it relates to their implementation of Hierarchical Temporal Memory (HTM). The Numenta pooler is considerably different from the current invention, and much more complicated. It requires the feed-forward (FF—up the hierarchy) of two distinct SDRs. The FF inputs are processed separately and combined as a weighted sum, then passed to a thresholding function. The result is given a "persistence" which increases if the activity continues and decays otherwise. The most persistent results are fed into a second pooler. This algorithm not only has many steps, there are many adjustable parameters: the summing weight, the threshold, the decay rate of the persistence, the increase for continued activity and the parameters of the second pooler.

Theyel et al. provide data from neuro-physiological studies showing that there are two pathways for feed-forward from one cortical region to another: either directly, or indirectly through the thalamus. Thus, the receiving cortical region receives (at least) two versions of the same data. The trans-thalamic pathway passes through more intermediate neurons and therefore (it is assumed) takes longer to reach its destination. This realization forms the inspiration for the current invention.

Embodiments of the present invention are an improvement over prior art systems and methods.

SUMMARY OF THE INVENTION

In one embodiment, the present invention provides a computational method for the simulation of a hierarchical artificial neural network (ANN), wherein a single correlator pools, during a single time-step, two or more consecutive feed-forward inputs from previously predicted and now active neurons of one or more lower levels.

In some embodiments, the single correlation is a static correlator. In some embodiments, pooling of feed-forward inputs is done by logical OR of consecutive feed-forward inputs. In some embodiments, pooling of feed-forward inputs is done by concatenating consecutive inputs. In some embodiments, a transformation operation is applied to each feed-forward input prior to pooling. In some embodiments, the transformation operation is any of the following: a permutation operation, a logical XOR operation, or a logical AND operation.

In another embodiment, the present invention provides a computational method for the simulation of a hierarchical artificial neural network (ANN), the method comprising: (a) correlating two pooled feed-forward inputs, $S(t)$, from time step, t, and $S(t-1)$, from time-step, t−1 for all times t; (b) indirectly learning correlation between input $S(t)$ and $S(t-t')$, where t' is a positive integer that is ≥2; and (c) outputting correlations learned in (a) and (b).

In some embodiments, the output is a sparse distributed representation (SDR) matrix. In some embodiments, the correlating step in (a) is done by a static correlator. In some embodiments, pooling of feed-forward inputs is done by logical OR of consecutive feed-forward inputs. In some embodiments, pooling of feed-forward inputs is done by concatenating consecutive inputs. In some embodiments, a transformation operation is applied to each feed-forward input prior to pooling. In some embodiments, the transformation operation is any of the following: a permutation operation, a logical XOR operation, or a logical AND operation.

In yet another embodiment, the present invention provides a computational method for the simulation of a hierarchical artificial neural network (ANN), the method comprising: (a) correlating three pooled feed-forward inputs, $S(t)$, from time step, t, $S(t-1)$, from time-step, t−1, and $S(t-2)$, from time step, t−2, for all times t; (b) indirectly learning correlation between input $S(t)$ and $S(t-t')$, where t' is a positive integer that is ≥3; and (c) outputting correlations learned in (a) and (b).

In some embodiments, the output is a sparse distributed representation (SDR) matrix. In some embodiments, the correlating step in (a) is done by a static correlator. In some embodiments, pooling of feed-forward inputs is done by logical OR of consecutive feed-forward inputs. In some embodiments, pooling of feed-forward inputs is done by concatenating consecutive inputs. In some embodiments, a transformation operation is applied to each feed-forward input prior to pooling. In some embodiments, the transformation operation is any of the following: a permutation operation, a logical XOR operation, or a logical AND operation.

In another embodiment, the present invention provides an article of manufacture storing computer readable program code implementing a computational method for the simulation of a hierarchical artificial neural network (ANN), the medium comprising: (a) computer readable program code correlating two pooled feed-forward inputs, $S(t)$, from time step, t, and $S(t-1)$, from time-step, t−1 for all times t; (b) computer readable program code indirectly learning correlation between input $S(t)$ and $S(t-t')$, where t' is a positive integer that is ≥2; and (c) computer readable program code outputting correlations learned in (a) and (b).

In yet another embodiment, the present invention provides an article of manufacture storing computer readable program code implementing a computational method for the simulation of a hierarchical artificial neural network (ANN), the medium comprising: (a) computer readable program code correlating three pooled feed-forward inputs, $S(t)$, from time step, t, $S(t-1)$, from time-step, t−1, and $S(t-2)$, from time step, t−2, for all times t; (b) computer readable program code indirectly learning correlation between input $S(t)$ and $S(t-t')$, where $t'$ is a positive integer that is $\geq 3$; and (c) computer readable program code outputting correlations learned in (a) and (b).

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 3 illustrates a sample pseudo code implementing the temporal pooling and correlation of the present invention.

DESCRIPTION OF THE PREFERRED EMBODIMENTS

Figure 1:
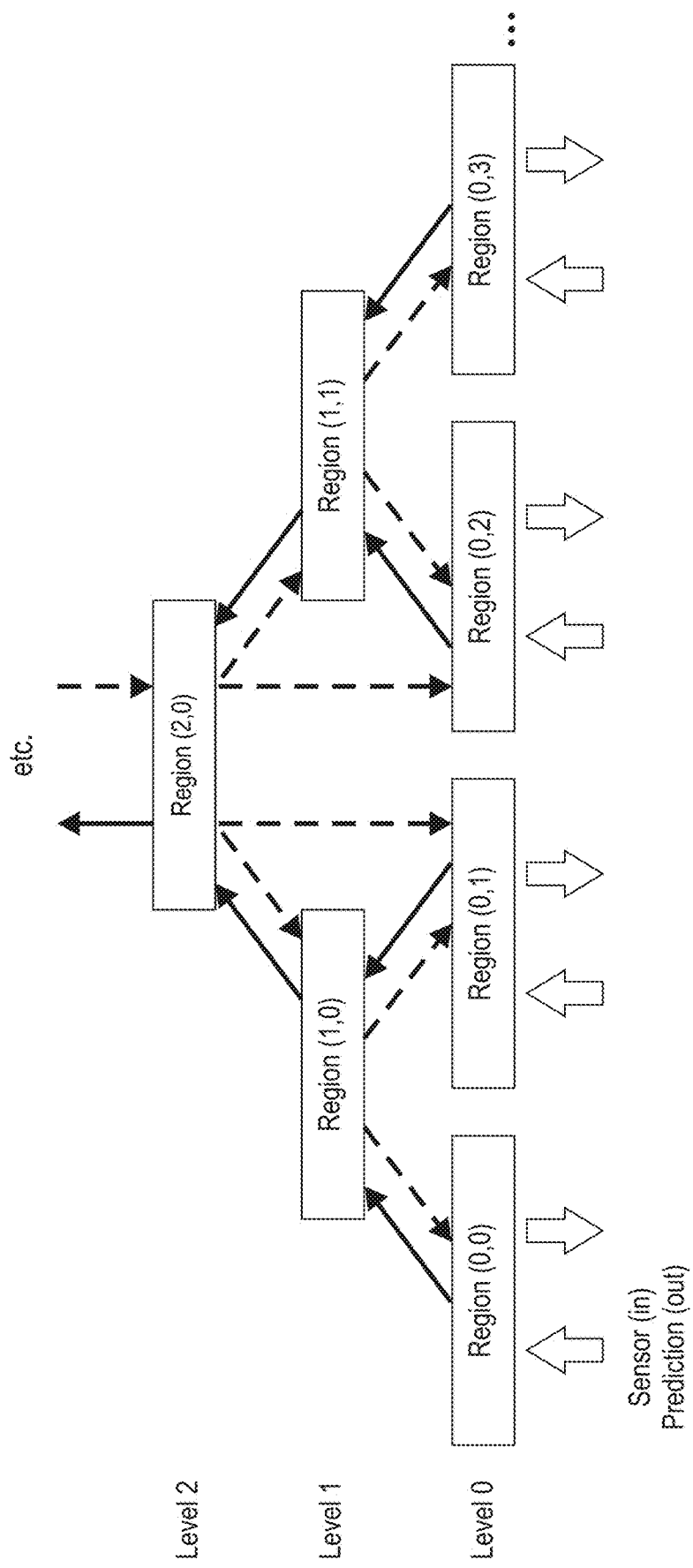
FIG. 1 illustrates an example of a hierarchical network consisting of 7 regions on three levels.

While this invention is illustrated and described with respect to preferred embodiments, the invention may be produced in many different configurations. There is depicted in the drawings, and will herein be described in detail, preferred embodiments of the invention, with the understanding that the present disclosure is to be considered as an exemplification of the principles of the invention and the associated functional specifications for its construction and is not intended to limit the invention to the embodiments illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

This invention relates to forming representations (SDRs) of sequences of input data. It operates by pooling and correlating two or more consecutive feed-forward inputs from the lower levels. The resulting representations are highly orthogonal for different input sequences, providing high capacity. Moreover, the representations tend to stabilize as the lower level(s) learn and more accurately predict longer sequences.

Figure 2:
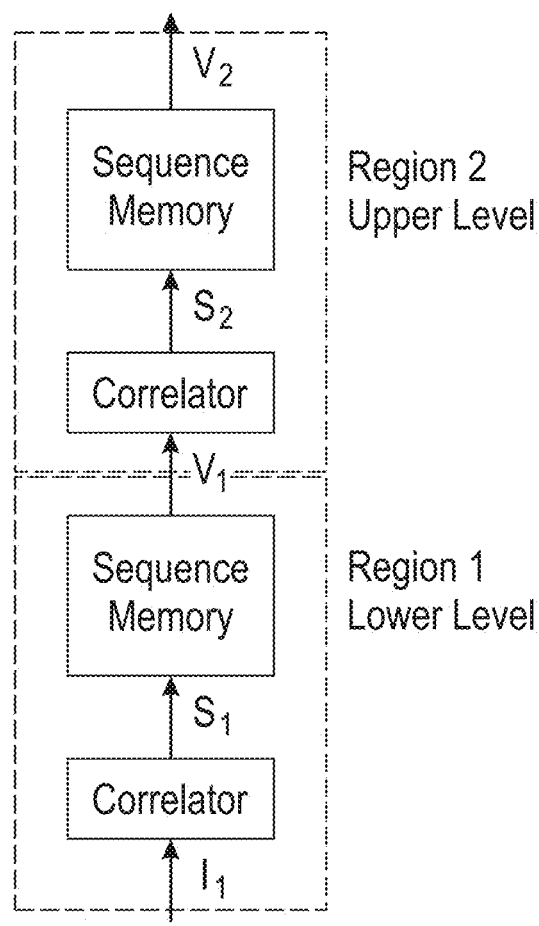
FIG. 2 illustrates two components in each region of a hierarchical network, i.e., a correlator and a sequence memory.

The algorithm that runs the hierarchical neural network operates as follows: Each region in the network receives data from one or more regions below it. Regions in the lowest level receive the (encoded) input data, for example from sensors, from cameras, as text characters, etc. Each region comprises, at least, two components which perform distinct tasks: a correlator and a sequence memory. FIG. 2 illustrates a sample architecture showing the two components of each region. For example, components of Region 1 of the lower level include: (1) a first correlator, which receives input data streams and identifies features as correlations among them, and (2) a first sequence memory, which receives the output, $S_1$, from the first correlator and stores the same in a first memory associated with Region 1. Similarly, components of Region 2 of the upper level include: (1) a second correlator, which receives the input, $V_1$, passed on from the first sequence memory below, and identifies features among received input, and (2) a second sequence memory, which receives the output, $S_2$, from the second correlator and stores the same in a second memory associated with Region 2. The correlator in each region, therefore, pools the different data-streams coming from below, and identifies features as correlations among them, i.e., bits that tend to be on during the same time-step.

The lowest level of the hierarchy typically has a static (or spatial) correlator. It finds features related to a single time step, forming an SDR representing these features and passing it to the sequence memory which, as the name suggests, learns to identify sequences of features. For example, the input to the bottom level might be the pixels forming the image of the letter 'd' and all occurrences of would be identified as the same feature coded as the same SDR by the spatial correlator. However, 'd' in 'and' is not the same as in 'bland' or 'brand.' Sequence memory therefore activates a different set of neurons (i.e., a different SDR) for these three different contexts for the letter 'd.' Then, the sequence, say, 'blan', generates a prediction for the appropriate set of 'd' cells. If the next letter is indeed 'd', the predicted cells are activated. These verified cells (e.g., $V_1$, $V_2$, etc.) are the output of sequence memory which is fed to the next level of the hierarchy.

An upper region in the hierarchy receives the FF data via axons from one or more regions below it. Since each axon originates on a specific neuron in the lower level, these input data represent, in the form of an SDR, the recent history of the activity in the lower levels, i.e., their current activity in the context of whatever preceded it. In this invention, temporal correlation is achieved by pooling, for example via logical OR, two or more consecutive FF inputs. As discussed in the examples, two inputs are sufficient, and a third improves the performance of the method. Additional inputs beyond three provide successively lesser improvement.

The invention operates in the following way. Consider the case of just two pooled inputs for simplicity. In this embodiment, the present invention provides a computational method for the simulation of a hierarchical artificial neural network (ANN), wherein the method comprises the steps of: (a) correlating two pooled feed-forward inputs, $S(t)$, from time step, $t$, and $S(t-1)$, from time-step, $t-1$ for all times $t$;

(b) indirectly learning correlation between input S(t) and S(t−t'), where t' is a positive integer that is ≥2; and (c) outputting correlations learned in (a) and (b). By this means correlations that last for an arbitrarily long time are found and reflected in the output SDR of the correlator. Most important, when a sequence is "known" to the system, as reflected in the fact that patterns coming from the lower level are changing in a predictable way, the output of the temporal correlator is stable and changes much more slowly than those lower in the hierarchy.

The same concept can be extended to three pooled inputs, and so on. For example, in the scenario where there are three pooled inputs, the present invention provides a computational method for the simulation of a hierarchical artificial neural network (ANN), comprising: (a) correlating three pooled feed-forward inputs, S(t), from time step, t, S(t−1), from time-step, t−1, and S(t−2), from time step, t−2, for all times t; (b) indirectly learning correlation between input S(t) and S(t−t'), where t' is a positive integer that is ≥3; and (c) outputting correlations learned in (a) and (b). in (b).

FIG. 3 depicts an example of pseudo-code for temporal pooling and correlation. The pseudo-code summarizes one example of computational procedures employed in the current invention. In this embodiment, which is iterative and intended to learn continuously, each procedure is repeated, for every time-step (t), where exactly the same sequence of procedures is carried out on the incoming data in every region (R) of the network, at each time-step (t).

The data enter each region in a section called the correlator. The input datum at each time step, from lower region(s) of the hierarchy, is in the form of a vector, of known length, set during network design. Data from multiple lower regions are combined by concatenation such that the length of the resulting input vector ($I_0$, where the zero subscript indicates the current input; see FIG. 2) is the sum of the lengths of all the output vectors of the lower regions. The order of concatenation determines the positions in the input vector of the vector elements from each input datum. The pseudo-code relates to binary vectors. It will be apparent that concatenation can also be applied to vectors of real numbers. Such combination of data by concatenation is termed "spatial pooling."

A feature of the present invention is a procedure called "temporal pooling". If a region is selected to employ temporal pooling (usually regions above the first level of the hierarchy), successive input vectors are combined. In this embodiment the temporal pooling or combination procedure is illustrated using binary vectors for which an appropriate pooling procedure is union (aka logical OR). More generally, other vector operations may be employed to combine successive input vectors, such as a weighted sum or (flattened) outer product. The number of successive (concatenated) vectors combined in this way can be two or more. If two inputs are to be combined the result is $I_R = OR(I_0, I_{-1})$, where the −1 subscript refers to the previous input time-step. Additional previous time-steps maybe similarly combined using the associative properties of OR. The procedure saves to memory the required number of inputs for temporal pooling at the next time-step, changing the subscripts accordingly.

The input vector to the correlator is, thus, the temporal pooling of one (no pooling) or two or more successive (temporally pooled) inputs from one or more regions lower in the hierarchy. The correlator is a matrix of synapse weights, indicating the strength of the connection between input (axons, or rows of the matrix) to outputs (dendrites or columns of the matrix). Outputs are activated using the well-known multiply, accumulate and threshold mechanism. Multiply and accumulate is accomplished by matrix multiplication of the input vector by the synaptic weight matrix. For binary vectors and matrices this results in an integer value for each output column. That value is compared with a (e.g., Heaviside step) threshold to determine whether the column is active or not. Other, non-binary, implementations using analog inputs, analog weights and a continuous threshold function will also be apparent. The output activity, another binary vector, $S_R$, is the input to the region's sequence memory.

When the input and output neural activities are known, synaptic updates are determined, using, for example, Hebbian learning rules. For a given synapse, if the input neuron and the output neuron are both active, then the synapse is strengthened, or created. If only the input, or only the output is active, then the synapse is weakened. If neither input nor output is active, then there is no change to synaptic strength Sequence memory consists of mini-columns of neurons, with each mini-column connected by (permanent) synapses to an output neuron of the correlator. If the correlator output neuron is active, the mini-column becomes active, meaning that one or more neurons in the mini-column fire. The rule for firing is that if any neuron in the mini-column is predicted (see discussion below), it fires. If no neuron is predicted, all the cells in the mini-column fire.

The neurons in the mini-columns (potentially) form synapses with other neurons in sequence memory, i.e., there is an array of lateral connections between the axons and dendrites of all the neurons in the region. In the current implementation, the firing pattern of the neurons is represented by a binary vector ($A_R$), and the synaptic weights by a binary matrix. The product of weight matrix and activity vector is another vector, the elements of which are compared with a threshold to determine whether each dendrite output is active. The neurons of active dendrites do not fire immediately; rather, they are predicted to fire if they receive input from the correlator on the next, or later, time-step. This modulated behavior is analogous to biological depolarization, which renders neurons more sensitive to input signals, and more likely to fire. The predicted cells are represented by the binary vector $P_0$.

Cells that were predicted in a previous time-step (e.g., vector $P_{-1}$), and are now activated ($A_R$) by the output of the correlator are "verified," i.e., $V_R = AND(A_R, P_{-1})$. The vector of verified neurons ($V_R$) of a lower region provides the input to higher regions.

Synapses are updated according to the usual Hebbian rules. Those that connect previously active cells ($A_{-1}$) to verified cells ($V_R$), i.e., those that contributed to a correct prediction, are strengthened. Those that contributed to a prediction that was not verified, or those on dendrites of cells that fire but were not predicted, are weakened.

Finally the current activity ($A_R$) and prediction ($P_0$) vectors are saved as $A_{-1}$, $P_{-1}$ in preparation for the next time-step.

For example, by pooling two consecutive inputs, the verified sequence ' . . . and', is correlated in one case with the prior verified sequence ' . . . ran', and in another with ' . . . lan'. Thus, the representations of 'brand' and "bland' are completely different. Due to the properties of sparse binary vectors, these representations are easily distinguished from each other.

There is no reason in an artificial neural network to limit the number of consecutive input to only two. Three or more provide faster learning. Indeed, there is no such thing as an identifiable sequence of two: if 'b' always follows 'a', then what follows 'b'? Either it is another character, or it is something that signals the end of the sequence, such as a period or a space. In either case the sequence is at least three time-steps.

A further advantage of using a correlator for forming SDRs to represent sequences is that it is simultaneously reducing the dimensionality of the data. The output of each sequence memory is not only changing on every time step, but because of the way sequence memory works, it is a very large and extremely sparse vector. Typically, it may have of order 10,000 bits (each corresponding to a neuron) of which less than 100 are set to 1 (indicating the active neurons). However, again due to the operation of sequence memory, it can take on "only" about $10^{60}$ to $10^{70}$ different values. In the correlator which receives this input, the same capacity can be reached in an output SDR of only 1024 bits, of which 32 are active. The correlation process reduces the length of the vector by an order of magnitude.

EXAMPLES

In all three examples described below, a network consisting of only two regions was set up, Region-1 (R1) on lower level 1, and Region-2 (R2) on upper level 2. Test data were generated with three arbitrary sentences, each of about 40-50 characters, picking one of the three at random and stringing them together to create a sequence 10,000 characters long. The ASCII code for each character was made sparse and fed into R1, one character at a time. After a few hundred iterations (one character per time-step), the sequence memory of R1 began to make correct predictions for the next character in the sequence. A sparse distributed representation (SDR) formed by the correctly predicted (verified) neurons is fed forward, with pooling of consecutive steps by logical OR, into the correlator of R2. The verified neurons of R1 are somewhat correlated, the same ones tending to be active for the same character in the same sequence.

In each example, the performance of the network was assessed by calculation of a learning metric. As is common practice in dealing with stochastic sequences, use is made of the probability that the prediction might have been made by random chance. Specifically, the overlap (intersection) of the input SDR and the predicted SDR is calculated. For random SDRs, the overlap is well known to follow a hypergeometric distribution. Because of the extreme range of possible values of the random probability (~0.1 for an overlap of 1 or 2 bits, to exponentially small for 10-20 bits) it is convenient to use the negative logarithm of the probability—call this the negative-log-likelihood or NLL. Since the probability is less than one, this is a positive number. In order to compare networks of different sizes, the NLL is normalized by dividing by the logarithm of the total number ($H_0$) of possible SDRs. Finally, it may be convenient to "smooth" the data by calculating a running average over some number of iterations. The learning metric is then $$L = -\frac{(\log(p_R))_t}{H_0}$$

Other learning metrics may be used, but ideally, they should start close to zero at the first iteration before the system has learned to make any accurate predictions, and approach a known maximum (such as one, as here) when every input is correctly predicted.

In addition, when a number of iterations are completed, it is desired to assess the stability (or "persistence") of the representations generated by the correlator of Region-2. This is done by counting the number of columns that remain active in successive iterations, normalized to the number of active columns. The result is averaged over several iterations.

Example 1

No Pooling

No correlation of consecutive inputs was made, that is to say that only each current input was used to train the correlator. The correlator of R2 encodes the correlations among the verified neurons into another SDR of lower dimensionality, which in turn is passed into the sequence memory of R2. After a few thousand iterations (corresponding to roughly 100 observations of each sentence), the sequence memory of R2 begins to make correct predictions of each of its input SDRs. The learning metric is applied to the overlap between predicted and actual SDRs in the sequence memory of both regions.

Figure 4:
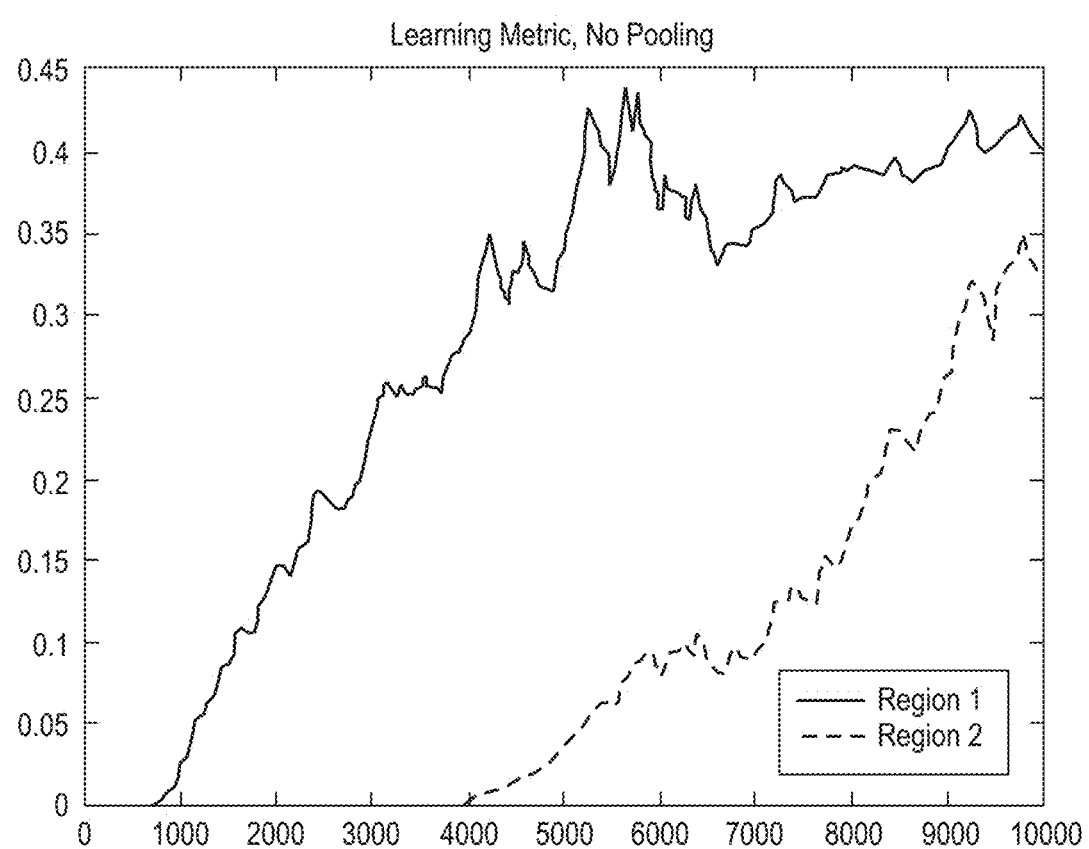
FIG. 4 illustrates learning metrics for a simplified network of just two regions, R1 and R2, with only single feed-forward input from R1 to R2, i.e., with no temporal pooling.
Figure 5:
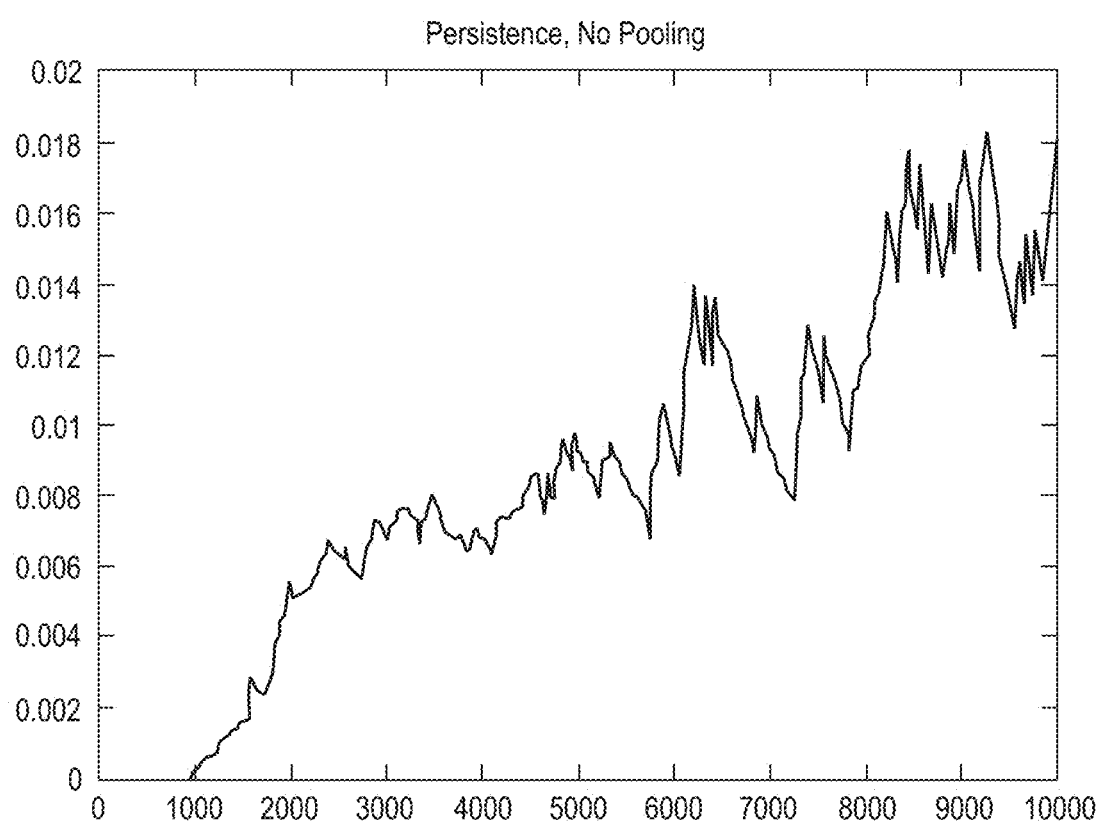
FIG. 5 illustrates a persistence metric for correlator output in region R2 of a simplified two-region network with only single feed-forward input from R1 to R2.

After 10,000 iterations, the mean learning in R1 & R2 reached 0.41 and 0.32 respectively (see FIG. 4). Learning in the upper region (R2) began at 4000 iterations. The average persistence ended at 0.016 (see FIG. 5).

Example 2

Pooling 2 Successive Inputs

In this example, the R2 correlator was programmed to pool two consecutive inputs at each step, the current feed-forward SDR and the one from the previous time-step.

Figure 6:
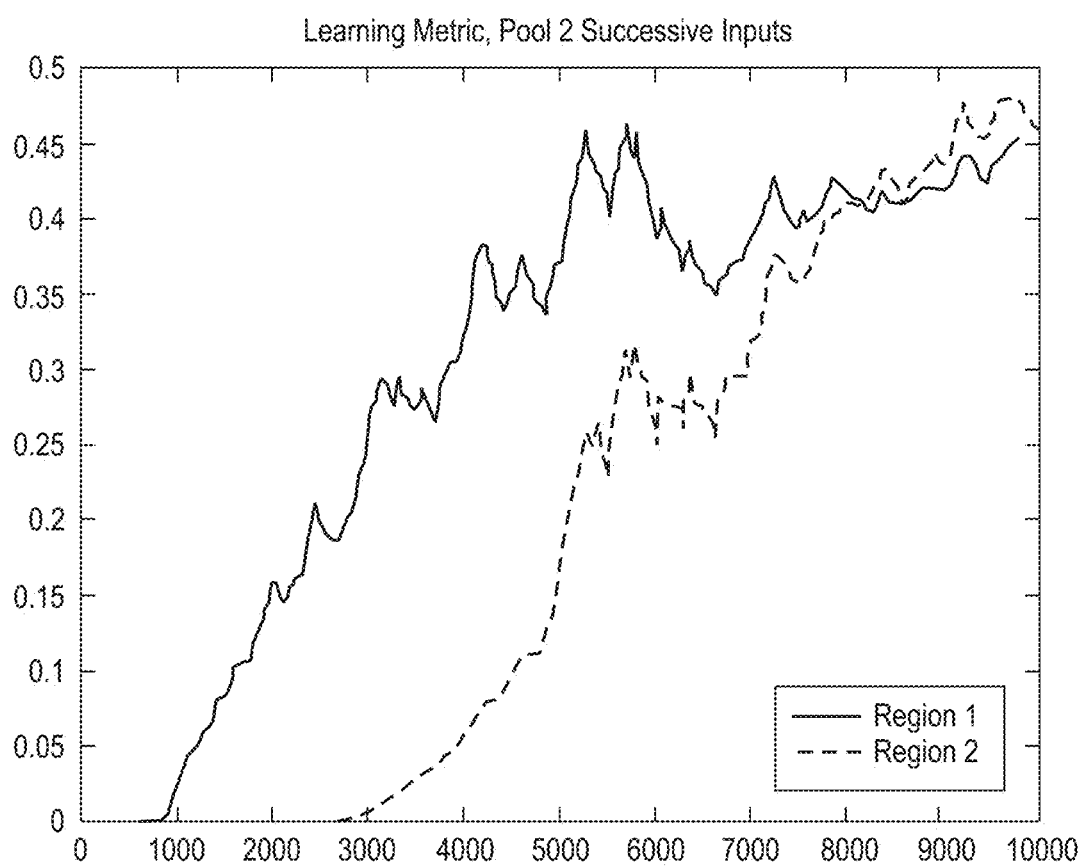
FIG. 6 illustrates a learning metric for correlator output in Region 2 with pooling of two consecutive feed-forward inputs from Region 1 to Region 2.
Figure 7:
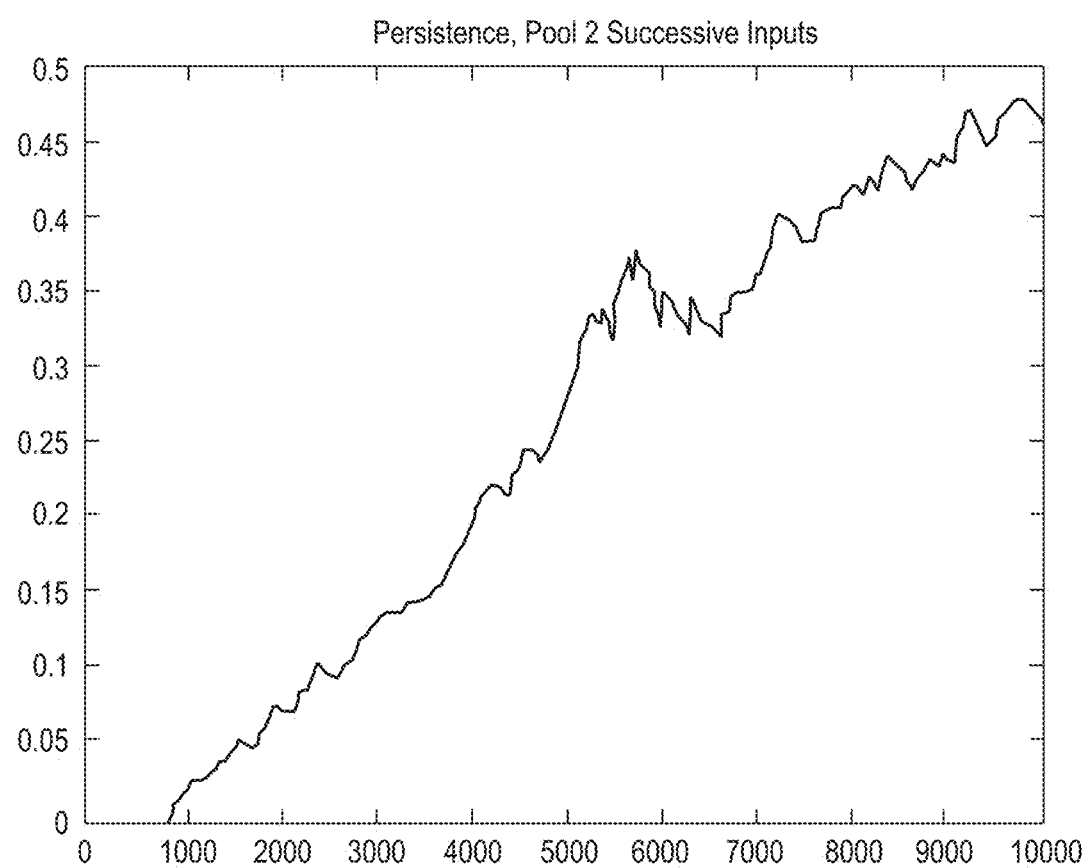
FIG. 7 illustrates persistence metric for correlator output in Region 2 with pooling of two consecutive feed-forward inputs from Region 1 to Region 2.

After 10,000 iterations, the mean learning in R1 & R2 reached 0.44 and 0.46 respectively (see FIG. 6). As expected there is no significant change in the behavior of the lower region. The upper one shows considerably more accurate learning. Also, learning in the upper region (R2) began earlier, at 3000 iterations. The average persistence reached at 0.46 (see FIG. 7). These results show clearly the improved performance of the network due to pooling, in terms of the speed and accuracy of learning in the upper region, and in terms of the stability of the representation created.

Example 3

Pooling 3 Successive Inputs

In this example, the Region-2 correlator was programmed to pool three consecutive inputs at each step, the current feed-forward SDR and those from two previous time-steps.

Figure 8:
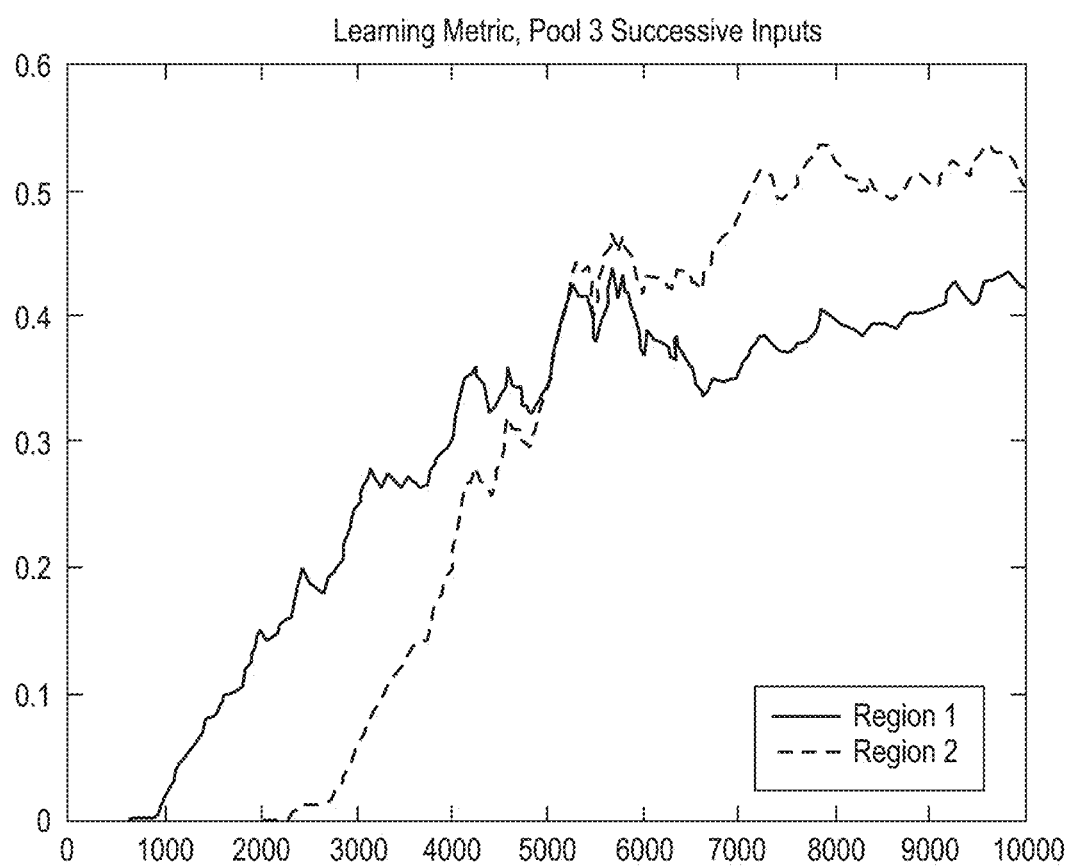
FIG. 8 illustrates learning metrics for both regions with pooling of three consecutive feed-forward inputs from Region 1 to Region 2.
Figure 9:
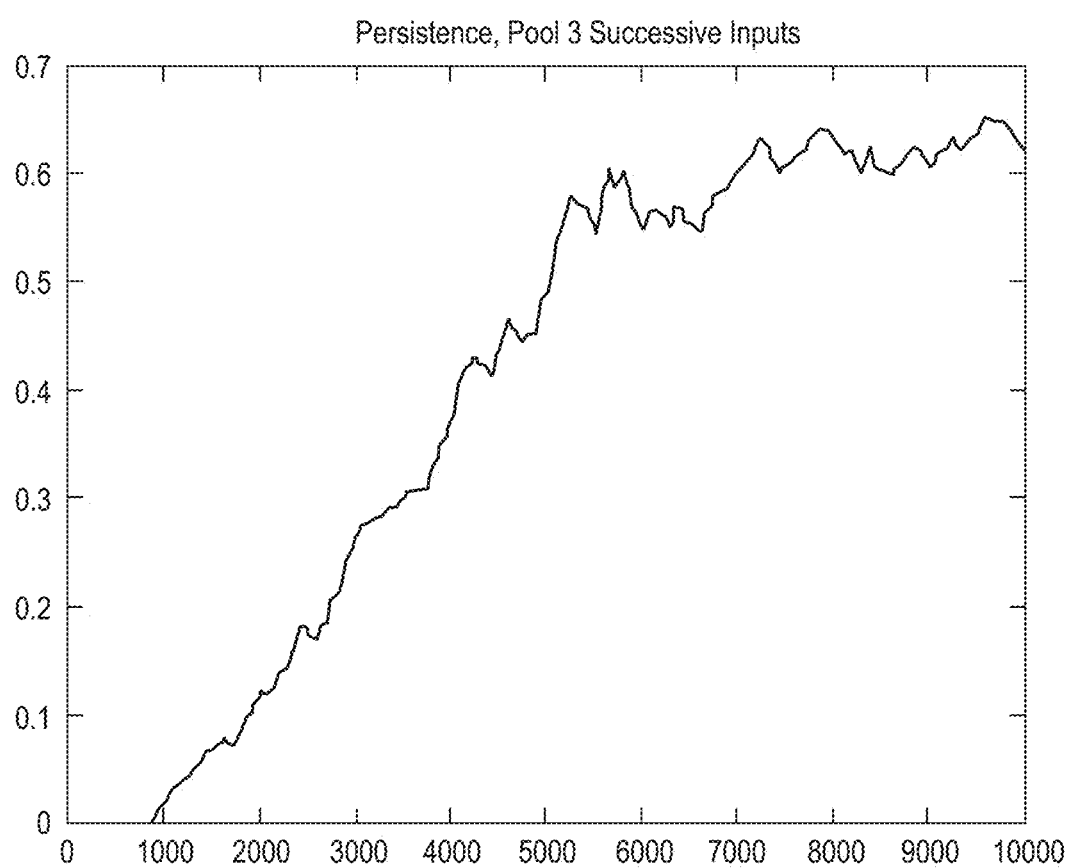
FIG. 9 illustrates the persistence metric for correlator output in Region 2 with pooling of three consecutive feed-forward inputs from Region 1 to Region 2.

After 10,000 iterations, the mean learning in R1 & R2 reached 0.42 (insignificant change relative to Example 2) and 0.51 (improved) respectively (see FIG. 8). Learning in the upper region (Region-2) began at 2000 iterations. The average persistence ended at 0.63 (see FIG. 9). These results show again the improved performance of the network due to pooling, in terms of the speed and accuracy of learning in the upper region, and in terms of the stability of the representation created.

It will be obvious to those practiced in the art, that more than three successive inputs may be pooled. In addition to the examples shown, pooling of 4 and 5 successive inputs, respectively, was applied to the same data and network. There was a modest increase in performance of 4 over 3, and very little difference between 5 and 4, except a steeper onset of learning. These examples demonstrate the effectiveness of pooling multiple consecutive inputs in the temporal correlator of a hierarchical neural network.

Figure 10:
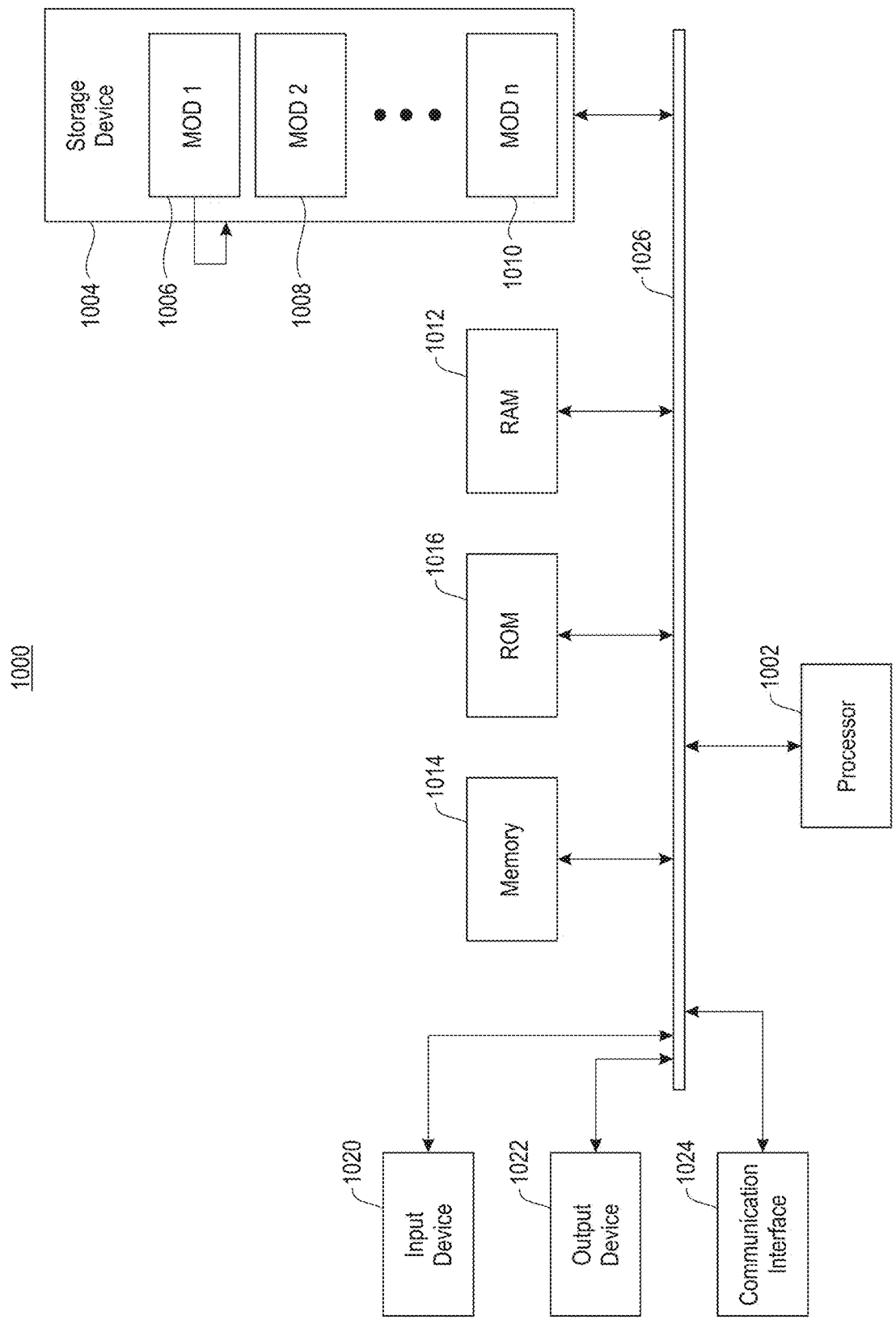
FIG. 10 depicts a system for implementing the present invention's methods.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1000 shown in FIG. 10 can practice all or part of the recited methods, can be a part of the recited systems, and/or can operate according to instructions in the recited non-transitory computer-readable storage media. With reference to FIG. 10, an exemplary system includes a general-purpose computing device 1000, including a processing unit (e.g., CPU) 1002 and a system bus 1026 that couples various system components including the system memory such as read only memory (ROM) 516 and random access memory (RAM) 1012 to the processing unit 1002. Other system memory 1014 may be available for use as well. It can be appreciated that the invention may operate on a computing device with more than one processing unit 1002 or on a group or cluster of computing devices networked together to provide greater processing capability. A processing unit 1020 can include a general purpose CPU controlled by software as well as a special-purpose processor.

The computing device 1000 further includes storage devices such as a storage device 1004 (such as, but not limited to, a magnetic disk drive, an optical disk drive, tape drive or the like). The storage device 1004 may be connected to the system bus 1026 by a drive interface. The drives and the associated computer readable media provide nonvolatile storage of computer readable instructions, data structures, program modules and other data for the computing device 1000. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a to computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 1000, an input device 1020 represents any number of input mechanisms, such as a microphone for speech, a touch-sensitive screen for gesture or graphical input, keyboard, mouse, motion input, speech and so forth. The output device 1022 can also be one or more of a number of output mechanisms known to those of skill in the art. In some instances, multimodal systems enable a user to provide multiple types of input to communicate with the computing device 1000. The communications interface 1024 generally governs and manages the user input and system output.

There is no restriction on the invention operating on any particular hardware arrangement and therefore the basic features here may easily be substituted for improved hardware or firmware arrangements as they are developed.

Logical operations can be implemented as modules configured to control the processor 1002 to perform particular functions according to the programming of the module. FIG. 10 also illustrates three modules MOD 1 1006, MOD 2 1008 and MOD 3 1010, which are modules controlling the processor 1002 to perform particular steps or a series of steps. These modules may be stored on the storage device 1004 and loaded into RAM 1012 or memory 1014 at runtime or may be stored as would be known in the art in other computer-readable memory locations.

In one embodiment, modules MOD 1 1006, MOD 2 1008 and MOD 3 1010 may, for example, be modules controlling the processor 502 to perform the following step: implementing a single correlator that pools, during a single time-step, two or more consecutive feed-forward inputs from previously predicted and now active neurons of one or more lower levels.

In another embodiment, modules MOD 1 1006, MOD 2 1008 and MOD 3 1010 may, for example, be modules controlling the processor 1002 to perform the following steps: (a) correlating two pooled feed-forward inputs, S(t), from time step, t, and S(t−1), from time-step, t−1 for all times t; (b) computer readable program code indirectly learning correlation between input S(t) and S(t−t'), where t' is a positive integer that is ≥2; and (c) computer readable program code outputting correlations learned in (a) and (b).

In another embodiment, modules MOD 1 1006, MOD 2 1008 and MOD 3 1010 may, for example, be modules controlling the processor 1002 to perform the following steps: (a) correlating three pooled feed-forward inputs, S(t), from time step, t, S(t−1), from time-step, t−1, and S(t−2), from time step, t−2, for all times t; (b) code indirectly learning correlation between input S(t) and S(t−t'), where t' is a positive integer that is ≥3; and (c) computer readable program code outputting correlations learned in (a) and (b).

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

CONCLUSION

A system and method has been shown in the above embodiments for the effective implementation of a computational method for temporal pooling and correlation. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method for operating a hierarchical artificial neural network (ANN), wherein the hierarchical ANN comprises a first level and one or more lower levels beneath the first level, the first level comprises a first correlator,
   the one or more lower levels, implemented by one or more processors, are configured to provide feed-forward inputs to the first level, the method comprising:
   the first correlator, implemented by one or more processors, pooling, during a single time-step, two or more consecutive feed-forward inputs each from a neuron of the previously predicted and now active neurons of the one or more lower levels, the two or more consecutive feed-forward inputs each from a neuron of the previously predicted and now active neurons of the one or more lower levels comprising a first feed-forward input received during the first time-step and a second feed-forward input received during a second time-step preceding the first time-step.

2. The method of claim 1, wherein the first correlator is a static correlator.

3. The method of claim 1, wherein the pooling of the two or more consecutive feed-forward inputs is done by logical OR of the two or more consecutive feed-forward inputs.

4. The method of claim 1, wherein the pooling of the two or more consecutive feed-forward inputs is done by concatenating the two or more consecutive feed-forward inputs.

5. The method of claim 1, further comprising applying a transformation operation to each of the two or more consecutive feed-forward inputs prior to the pooling.

6. The method of claim 5, wherein the transformation operation is any of the following: a permutation operation, a logical XOR operation, or a logical AND operation.

7. A method for operating a hierarchical artificial neural network (ANN), wherein the hierarchical ANN comprises a first level and one or more lower levels beneath the first level, the first level comprises a first correlator,
the one or more lower levels, implemented by one or more processors, are configured to provide feed-forward inputs to the first level, the method comprising:
(a) correlating by the first correlator, implemented by one or more processors, two pooled feed-forward inputs: $S(t)$, from time step $t$; and $S(t-1)$, from time-step $t-1$, for all times t, wherein $S(t)$ and $S(t-1)$ are each from a neuron of the one or more lower levels;
(b) learning correlation between pooled feed-forward input $S(t)$ and pooled feed-forward input $S(t-t')$, where t' is a positive integer that is >2; and
(c) providing correlations learned in (a) and (b) as an output.

8. The method of claim 7, wherein the output is a sparse distributed representation (SDR) matrix.

9. The method of claim 7, wherein the correlating step in (a) is done by a static correlator.

10. The method of claim 7, further comprising pooling the feed-forward inputs by logical OR of consecutive feed-forward inputs.

11. The method of claim 7, further comprising pooling of the feed-forward inputs by concatenating consecutive feed-forward inputs.

12. The method of claim 7, further comprising:
pooling the feed-forward inputs; and
applying a transformation operation to each feed-forward input prior to the pooling.

13. The method of claim 12, wherein the transformation operation is any of the following: a permutation operation, a logical XOR operation, or a logical AND operation.

14. A method for operating a hierarchical artificial neural network (ANN), wherein the hierarchical ANN comprises a first level and one or more lower levels beneath the first level, the first level comprises a first correlator,
the one or more lower levels, implemented by one or more processors, are configured to provide feed-forward inputs to the first level, the method comprising:
(a) correlating by the first correlator, implemented by one or more processors, three pooled feed-forward inputs: $S(t)$, from time step $t$; $S(t-1)$, from time-step $t-1$; and $S(t-2)$, from time step $t-2$, for all times t, wherein $S(t)$, $S(t-1)$, and $S(t-2)$ are each from a neuron of the one or more lower levels;
(b) learning correlation between pooled feed-forward input $S(t)$ and pooled feed-forward input $S(t-t')$, where t' is a positive integer that is >3; and
(c) providing correlations learned in (a) and (b) as an output.

15. The method of claim 14, wherein the output is a sparse distributed representation (SDR) matrix.

16. The method of claim 14, wherein the correlating step in (a) is done by a static correlator.

17. The method of claim 14, further comprising pooling of the feed-forward inputs by logical OR of consecutive feed-forward inputs.

18. The method of claim 14, further comprising pooling of the feed-forward inputs by concatenating consecutive feed-forward inputs.

19. The method of claim 14, further comprising:
pooling the feed-forward inputs; and
applying a transformation operation to each feed-forward input prior to the pooling.

20. The method of claim 19, wherein the transformation operation is any of the following: a permutation operation, a logical XOR operation, or a logical AND operation.

21. A non-transitory computer readable medium having computer-executable instructions stored thereon, the instructions executable to perform-a method for for operating a hierarchical artificial neural network (ANN), wherein
the hierarchical ANN comprises a first level and one or more lower levels beneath the first level,
the first level comprises a first correlator,
the one or more lower levels, implemented by one or more processors, are configured to provide feed-forward inputs to the first level, the instructions comprising:
(a) computer-executable instructions causing the first correlator to correlate two pooled feed-forward inputs: $S(t)$, from time step $t$; and $S(t-1)$, from time-step $t-1$, for all times t, wherein $S(t)$ and $S(t-1)$ are each from a neuron of the one or more lower levels;
(b) computer-executable instructions learning correlation between pooled feed-forward input $S(t)$ and pooled feed-forward input $S(t-t')$, where t' is a positive integer that is >2; and
(c) computer-executable instructions outputting correlations learned in (a) and (b).

22. A non-transitory computer readable medium having computer-executable instructions stored thereon, the instructions executable to perform a method for for operating a hierarchical artificial neural network (ANN), wherein
the hierarchical ANN comprises a first level and one or more lower levels beneath the first level,
the first level comprises a first correlator,
the one or more lower levels, implemented by one or more processors, are configured to provide feed-forward inputs to the first level, the instructions comprising:
(a) computer-executable instructions causing the first correlator to correlate three pooled feed-forward inputs: $S(t)$, from time step $t$; $S(t-1)$, from time-step $t-1$; and $S(t-2)$, from time step $t-2$, for all times t, wherein $S(t)$, $S(t-1)$, and $S(t-2)$ are each from a neuron of the one or more lower levels;
(b) computer-executable instructions learning correlation between pooled feed-forward input $S(t)$ and pooled feed-forward input $S(t-t')$, where t' is a positive integer that is >3; and (c) computer-executable instructions outputting correlations learned in (a) and (b).

\* \* \* \* \*